Oct. 20, 1959  J. R. McCLOUD  2,909,629
MOTOR SPRING OPERATING MECHANISM FOR OIL CIRCUIT BREAKERS
Filed July 2, 1957  3 Sheets-Sheet 1
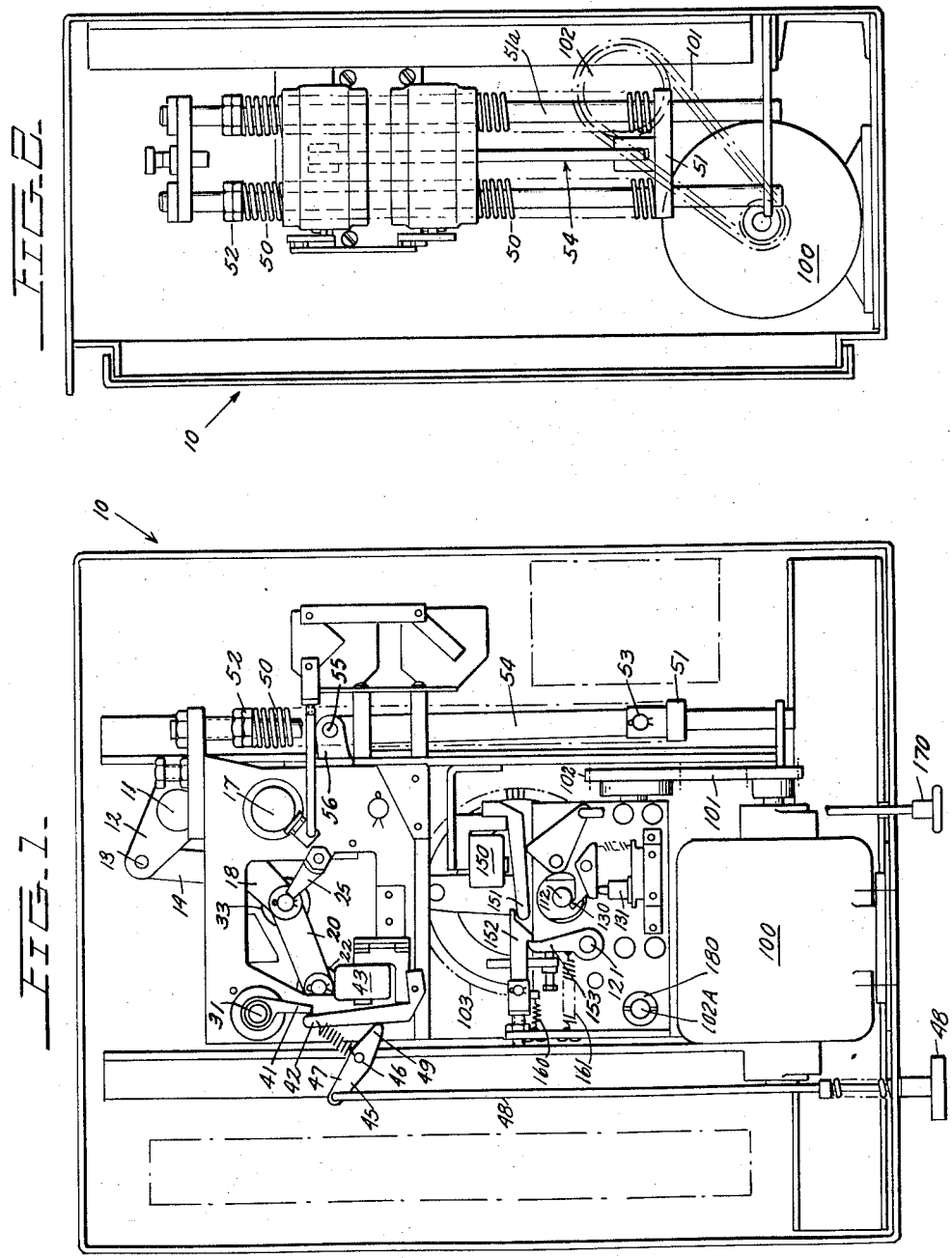
INVENTOR.
JAMES R. McCLOUD
BY
ATTORNEYS Oct. 20, 1959  J. R. McCLOUD  2,909,629
MOTOR SPRING OPERATING MECHANISM FOR OIL CIRCUIT BREAKERS
Filed July 2, 1957  3 Sheets-Sheet 2
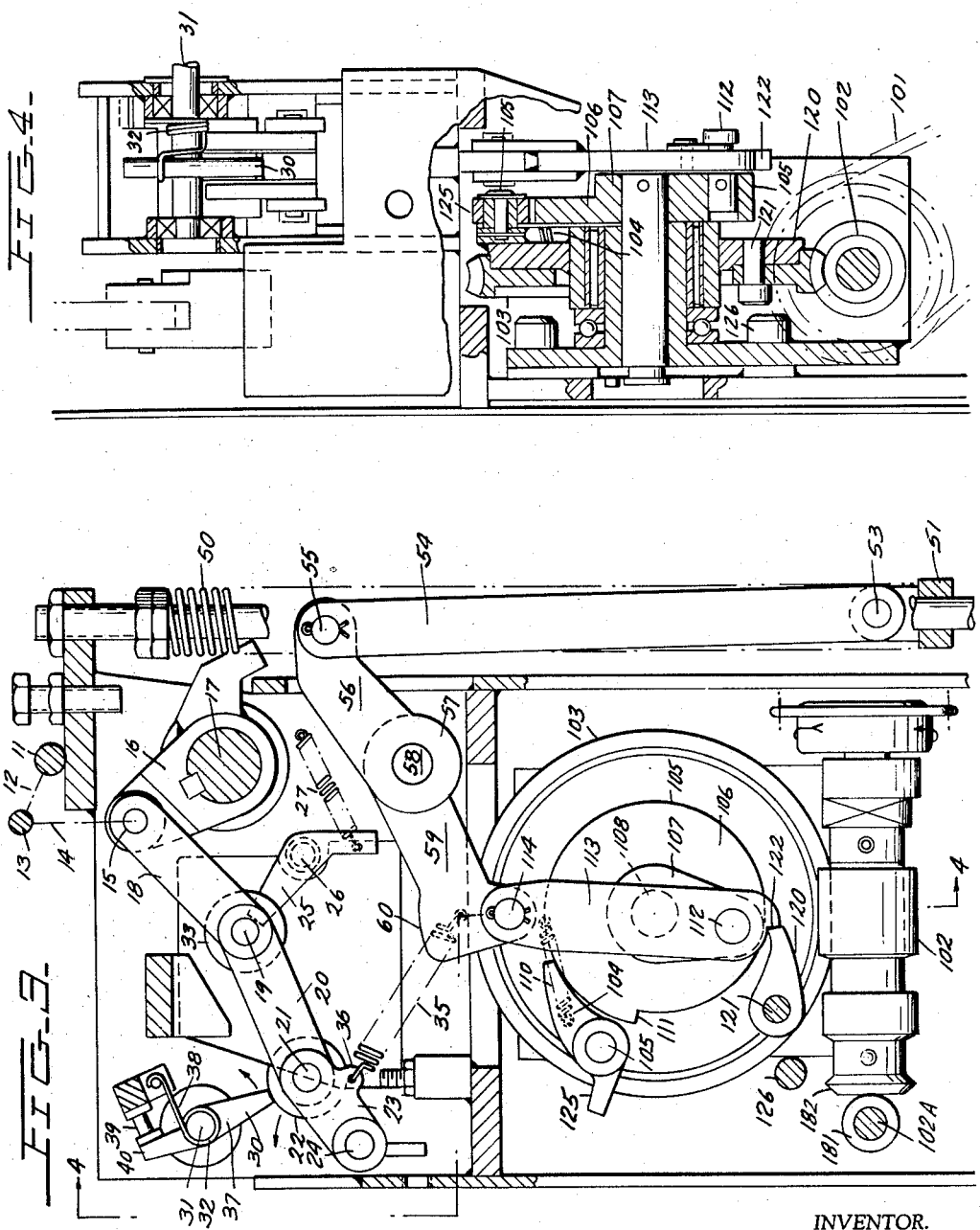
INVENTOR.
JAMES R. McCLOUD
BY
ATTORNEYS Oct. 20, 1959  J. R. McCLOUD  2,909,629
MOTOR SPRING OPERATING MECHANISM FOR OIL CIRCUIT BREAKERS
Filed July 2, 1957  3 Sheets-Sheet 3
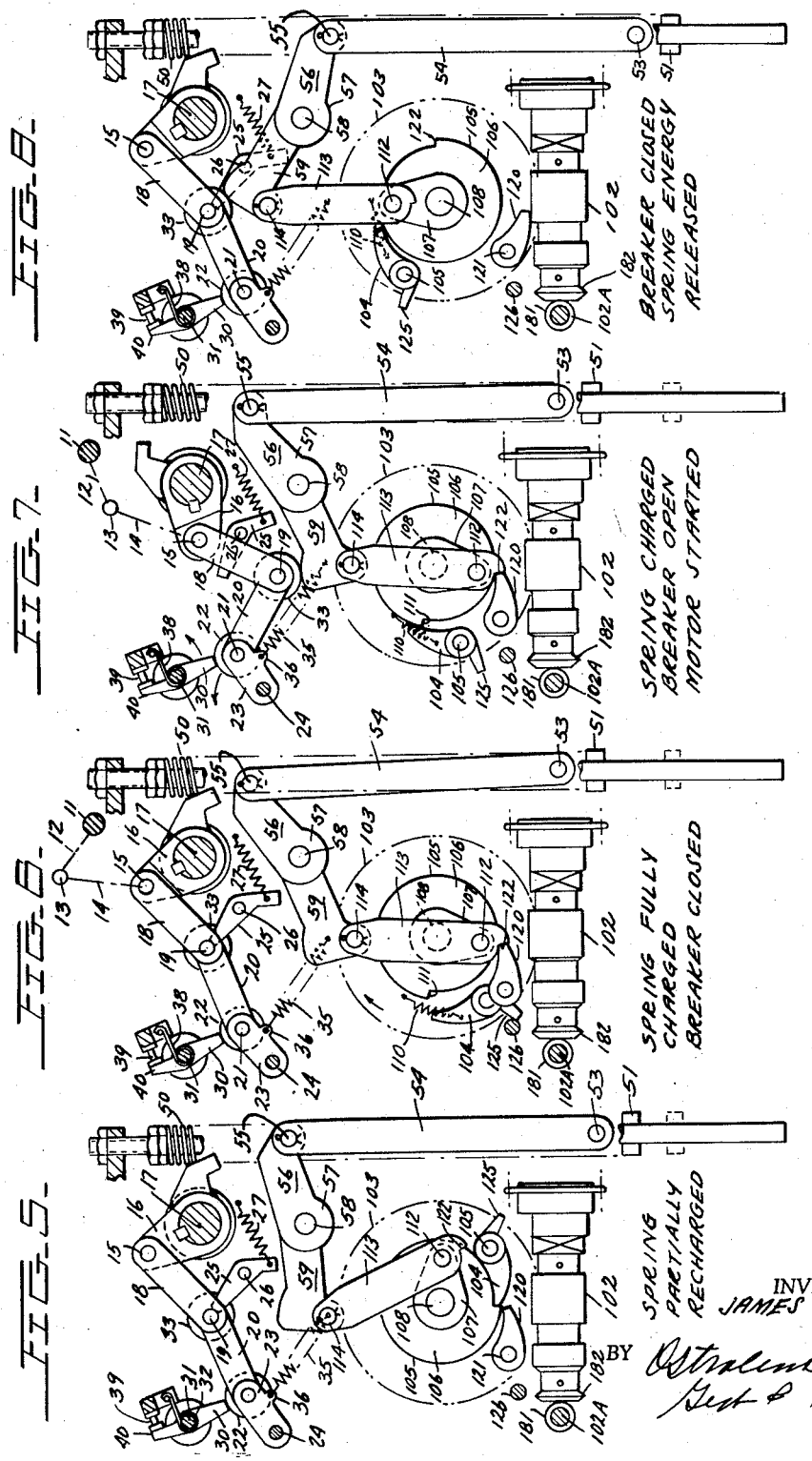
INVENTOR.
JAMES R. McCLOUD
BY
ATTORNEYS

United States Patent Office 2,909,629
Patented Oct. 20, 1959

2,909,629

MOTOR SPRING OPERATING MECHANISM FOR OIL CIRCUIT BREAKERS

James R. McCloud, Burbank, Calif., assignor, by mesne assignments, to I-T-E Circuit Breaker Company, Philadelphia, Pa., a corporation of Pennsylvania Application July 2, 1957, Serial No. 669,524

10 Claims. (Cl. 200—92)

My present invention relates to circuit breakers and more particularly to circuit breaker operating mechanisms which are adapted to charge reclosing devices such as springs and which are arranged so that the charged reclosing devices may be released as required to close the circuit breaker.

Circuit breakers to meet the need of present day conditions require an operating mechanism capable of closing the breaker at a consistent speed under no load and fault conditions. It is also necessary that the same operating conditions are met when it is necessary to close the breaker manually. Many systems of stored energy have been used to operate circuit breakers, but a careful analysis of the requirements imposed upon an operating mechanism as well as the economics involved, indicates the use of helical compression springs as an excellent method of storing the necessary energy to close circuit breakers, especially those in the 4 kv. and 14.4 kv. class.

The most difficult problem facing the designer in using springs as a means of stored energy to close a circuit breaker is the desirable feature of disconnecting the motor from the spring charging mechanism after the springs have been compressed. Some of the methods used in the past to disconnect the motor from the spring charging mechanism have been over load release clutches and disengaging tooth clutches. The above mentioned clutches were costly to make, in some cases subject to critical adjustment, and at times failed to operate properly under field conditions.

My invention has for its object the provision of motor or other charging means for compressing or otherwise charging reclosing members such as springs.

More particularly my invention has for its primary object the arrangement of such motor charging means in such manner that a simple disconnect is provided between the motor and the means to be charged when the charging operation is completed.

My invention is further directed to a motor charging device in which the charging of the reclosing elements will take place immediately and automatically upon discharge of the said elements whether the circuit breaker is closed thereby or not, that is, in the event of a tripping operation at the time of closing or in the event of accidental or other operation of a trip latch during closing.

The foregoing and many other objects of my invention will become apparent in the following description and drawings in which:

Figure 1 is a side view partially broken away of my novel circuit breaker operating elements.

Figure 2 is an end view taken from the right side of Figure 1.

Figure 3 is an enlarged side view of the operating toggles and charging members of my novel circuit breaker operating elements.

Figure 4 is an end view taken from the left side of Figure 3.

Figures 5, 6, 7 and 8 are schematic views showing successive positions of the circuit breaker operating elements of Figure 3 showing (Figure 5) the circuit breaker closed and the closing springs being recharged; (Figure 6) the circuit breaker closed and the springs fully recharged; (Figure 7) the circuit breaker open and the springs charged and ready to close the circuit breaker on demand; (Figure 8) the springs discharged to close the circuit breaker and the motor started to recharge the springs to move the reclosing elements from the position of Figure 8 through the position of Figure 5 to the position of Figure 6 where the springs are ready to reclose the circuit breaker should it trip open to the position of Figure 7.

In order to understand fully the operation of my novel closing spring charging device, a brief resume of the operation of the circuit breaker itself will first be made.

The circuit breaker in housing 10 comprises a contact actuating shaft 11 which is connected in any suitable manner, to operate the moving contacts (not shown) of an oil circuit breaker; shaft 11 is rotated clockwise with respect to the figures to close the circuit breaker and counterclockwise to open the circuit breaker.

The closed position of the circuit breaker is shown in Figures 1, 3, 5, 6 and 8. The open position is shown in Figure 7.

Operating shaft 11 is connected by crank 12 to pin 13 which is connected by link 14 to pin 15 on crank 16 of output shaft 17. Cranks 13 and 16 and link 14 and the center to center dimension between shafts 11 and 17 form a parallelogram so that cranks 12 and 16 operate together.

Crank 16 is connected by pin 15 to toggle link 18 which is in toggle relation through knee pin 19 with toggle link 20. Link 20 is connected to pin 21 carrying the latch roller 22. Latch roller 22 on pin 21 is mounted on latch link 23 which is stationarily pivoted at pin 24.

When the circuit breaker is closed, knee pin 19 of toggle 18—20 rests on latch prop 25 which is pivotally mounted on pin 26 and biased by tension spring 27 in a counterclockwise position toward the position shown in Figures 1, 3, 5, 6 and 8 against a suitable stop (not shown).

A biasing force (when the circuit breaker is closed) owing to the usual opening springs of the circuit breaker (not shown) acts on crank 12 and therefore crank 16 to drive pin 15 and toggle 18—20 to the left with respect to the figures. This force is resisted by latch member 30 bearing against latch roller 22 and preventing links 20—23 from breaking upwardly. When latch member 30 rotates counterclockwise on its shaft 31 the prop is removed from links 20—23, they may break upwardly permitting toggle 18—20 to move bodily to the left. This permits pin 19 to move off the latch prop 25 and the toggle 18—20 to collapse with pin 19 moving downwardly permitting the circuit breaker to open. This will occur even if upward closing pressure is applied to roller 33 on pin 19; since the roller and pin will move off the closing device hereinafter described, the circuit breaker is therefore trip free.

After toggle 18—20 has thus collapsed opening the circuit breaker, then, if the closing device has been removed from interfering relationship with the side of roller 33 or, if the closing device was withdrawn prior to tripping, the toggle resetting tension spring 35 connected between a stationary point on the frame and lug 36 on latch link 23 will re-set the toggles to the position of Figure 7 ready for a reclosing operation.

The reclosing operation raises pin 19 extending toggle 18—20 to the position of Figures 1, 3, 5, 6 and 8 until the pin 19 pushes aside prop 25 and rests on the top of prop 25. At this time shafts 17 and 11 have been rotated full clockwise and the circuit breaker is closed.

Latch 30 is one arm of a lever 37 and is biased toward latching position by coil spring 38. The appropriate latching position of latch 30 and lever 37 with respect to latch roller 22 is fixed by stop 39 against which arm 40 of lever 37 bears.

Shaft 31 of latch 30 carries trip arm 41 (see Figure 1) which may be engaged by armature 42 to rotate the shaft 31 and latch 30 counterclockwise to tripping position where the roller 22 is no longer engaged by latch 30. A coil 43 is provided to move the armature 42 to the right under over current conditions or under other conditions to which the coil 43 is responsive.

Where it is desired to open the circuit breaker manually, a lever 45 is provided on pivot 46. One arm 47 of lever 45 is connected to pull bar 48. The other arm 49 of lever 45 is in camming relation with armature 42 so that when the lever 45 is rotated counterclockwise by a downward pull on pull bar 48, armature 42 and trip bar 41 are rotated to trip position to open the circuit breaker.

The closing device for my circuit breaker comprises helical closing springs 50 which are compressible between the movable compressing bar 51 and the adjustable stationary stop nuts 52. Compressing bar 51 rides on the rods 51a which also guide the springs 50. The center of compressing bar 51 is connected by pin 53 to the lower end of actuating link 54. The upper end of actuating link 54 is connected by pin 55 to arm 56 of lever 57 rotatable on shaft 58. The opposite arm 59 of lever 57 is provided with an appropriately curved camming surface 60 which (see Figure 7—the open position of the circuit breaker) will bear against roller 33 on knee-pin 19 of toggle 18—20. It should be noted that with lever 57 in the position of Figures 3, 6, 7, the closing springs 50 have been compressed and through their pressure on bar 51 exert a downward pressure on actuating link 54 thereby exerting a force to rotate lever 57 clockwise from the position of Figures 3, 6 and 7 to the position of Figure 8.

The springs 50 when charged and lever 57 when in the position of Figures 3, 6 and 7 are of course latched (as hereinafter described) with the latch released when it is desired to close the circuit breaker from the position of Figure 7 to the position of Figure 8.

This charging and latching operation can take place prior to closing while the circuit breaker is open (the trip-free position) with roller 33 at the side of cam 60; or, as is more usual, can take place while the circuit breaker is closed with the lever 57 being moved from the position of Figure 8 through the position of Figure 5 to to the position of Figures 3 and 6 without interfering with the closed position of the circuit breaker, the circuit breaker then remaining closed because pin 19 of toggle 18—20 is propped on member 25 and because the latch roller 22 is engaged by latch 30.

The energy to rotate lever 57 counterclockwise and raise actuating link 54 and compressing bar 51 to compress or charge springs 50 is obtained from motor 100 (Figures 1 and 2). Motor 100 is connected in any suitable manner as by chain drive 101 to drive the helical gear 102. Helical gear 102 drives worm gear 103. A pawl 104 is rotatably mounted on pin 105 or worm gear 103 and is biased by spring 110 into engagement with surface 105 of disc 106 which disc 106 is either integral with crank 107 or keyed to shaft 108 to which crank 107 is keyed.

When, now, with the elements in the position of Figure 8 (or, at least lever 57 in the position of Figure 8) and with springs 50 extended, the motor 100 is started, the worm gear 103 is rotated clockwise and pawl 104 moves into the detent or notch 111 on disc 106. Continued rotation of worm gear 103 and pawl 104 against detent or notch 111 rotates disc 106 and crank 107 from the position of Figure 8 through the position of Figure 5 to the position of Figure 6. Owing to this operation, crank 107, connected by pin 112 to link 113 which in turn is connected by pin 114 to arm 59 of lever 57 has rotated the arm 59 in a clockwise direction and has through actuating link 54 compressed springs 50.

Springs 50 are now operative to rotate arm 59 back from the position of Figure 7 to the position of Figure 8 and thus to close the circuit breaker after it has opened.

When the spring charging operation is completed (Figure 8 to Figure 5 to Figures 6 and 7), the link 113 moves just past center, that is, pins 112 and 114 are now arranged so that the force of springs 50 acting on them through arm 59 and link 113 tends to rotate crank 107 clockwise. At this point, latch 120 pivoted on stationary pin 121 engages latch detent 122 on link 113 and prevents further rotation of crank E thereby holding arm 59 in the position of Figures 3, 6 and 7 and maintaining springs 50 charged.

Simultaneously, extension 125 of pawl 104 engages stationary pin 126 which rotates the pawl 104 out of engagement with detent 111. This disengagement is facilitated by the fact that the over center position of pins 114 and 112 has momentarily pulled crank 107, disc 106 and detent 111 away from pawl 104.

Therefore, even if motor 100 continued to operate, gear 103 and pawl 104 would move around with pawl 104 being tipped out of operative engagement with detent 111 every time it passed pin 126.

When, however, the elements reach the position of Figure 6, pin 112 engages finger 130 (Figure 1) to operate limit switch 131 to turn off the motor 100.

The springs 50 are now in the position of Figures 6 and 7 ready to close the circuit breaker when it is open (see particularly Figure 7).

After the circuit breaker is open (Figure 7) and it is desired to close it, that is, to operate the elements to the position of Figure 8, it is necessary to release the latch 120 to remove any resistance to extension of springs 50 so that the springs 50 may move cross-bar 51 and actuating link 54 down to rotate arm 59 so that the cam section 60 thereof may raise roller 33 and pin 19 to extend toggle 18–20 and rotate shaftes 17 and 11 to close the circuit breaker.

For this purpose closing coil 150 (Figure 1) is energized in any suitable manner as by a push-button and from a source (not shown) to raise armature 151. Armature 151 raises latch 152 which engages latch arm 153; latch arm 153 is keyed to shaft 121 (Figure 3) which carries latch 120. The engaging surfaces of latch 120 and latch surface 122 on link 113 are so shaped that, with latch 120 now free to be pushed down (by release of latch arm 152) the latch 120 is pushed out of the way by the force exerted thereon through link 113 by springs 50 and the elements may now all move from the position of Figure 7 to the position of Figure 8, the cam surface 60 of arm 59 moving the roller 33 of toggle 18–20 up and closing the circuit breaker.

Tension springs 160 and 161 (Figure 1) for respectively latch 152 and latch arm 153 restore these elements to their latched position in preparation for the next spring charging operation.

Push rod 170 may also be provided (Figure 1) to raise armature 151 to initiate the closing operation.

When the springs 50 are released to move the elements from the position of Figure 7 to Figure 8, the rapid upward movement of arm 59 is brought to a smooth halt as pin 112 of crank 107 reaches its highest point.

When the closing action starts, finger 130 is disengaged from pin 112 limit switch 131 now energizes the motor 100 through an appropriate relay to start the spring charging operation. The closing operation moves the elements rapidly ahead of the worm gear 103 so that pawl 104 can catch up with detent 111 only after the closing operation is completed.

Thus, as soon as the closing operation starts, motor 100 is energized and worm gear 103 and pawl 104 move clockwise. But crank 107 and detent 111 move from the position of Figure 7 to that of Figure 8 ahead of pawl 104 so that at the end of the closing operation (Figure 8) pawl 104 is behind detent 111. Pawl 104 continues and catches up with detent 111 to drive the closing elements and springs 50 from the position of Figure 8 through that of Figure 5 to that of Figure 6; when the closing elements are charged in the position of Figure 6, the motor is halted as above pointed out and the device is ready in the event of opening of the circuit breaker (Figure 7) to reclose it again (Figure 8 to Figure 5 to Figure 6).

It should be noted that during the closing stroke, the forces imposed on the output shafts 17 and 11 of the operating mechanism become increasingly greater because of the gradual extension of toggle 18—20 and the contour of cam face 60 of closing arm 59. This insures adequate power for closing the circuit breaker under fault conditions even though, at or near the end of the closing stroke, the springs 50 are in substantially extended condition.

As pointed out above, the operating mechanism is of the trip free type in that roller 33 may move off cam surface 60 to permit collapse of toggle 18—20 at any point during the closing stroke.

In the event of temporary loss of electric power for operating motor 100, the circuit breaker may be provided with a handle receiving extension 180 (Figure 1) for shaft 102A which carries a bevel gear 181 (Figure 3) engaging bevel gear 182 connected to gear 102. By this means gear 102 may be manually rotated to recharge the closing springs 50.

In the foregoing I have described my invention in connection with illustrative embodiments thereof, since many variations and modifications of my invention will now be obvious to those skilled in the art, I prefer to be bound not by the specific disclosures herein contained but only by the appended claims.

I claim:

1. In switchgear having a movable contact and a complementary contact spring means chargeable preparatory to closing of the contacts thereof the releasable to close the said contacts; means for charging the said spring means and for releasably retaining said spring means in charged position comprising a member connected to said spring means for moving the same in a spring charging direction; said member being subject to the biasing action of the spring means after the same is charged; a rocking lever and a rotatable support therefor; an actuating link connected at one end thereof to said member and pivotally connected at its opposite end to said lever on one side of said rotatable support; a driving link having one end thereof pivotally connected to said lever on the opposite side of said rotatable support; a crank connected to the opposite end of said driving link; operating means for rotating said crank in a direction to move said driving link to rotate said lever to move said actuating link and operate said first mentioned member to charge said spring means; said operating means comprising a latch member secured to and concentric with said crank; a rotatable drive member concentric with said latch member; a driving pawl on said rotatable drive member and a pawl detent on said latch member facing and engageable by the pawl when the drive member is rotated in one direction; said pawl engaging said pawl detent on the latch member when the said drive member is rotated in said one direction and thereby rotating said latch member and the crank; said crank moving said drive link, said lever and said actuating link in a direction to charge said spring means; means for disengaging said pawl from said pawl detent immediately after the actuating link has fully charged the spring means and after said driving link and crank have passed the center of rotation of the crank and are subjected by the charged spring means to further rotation in the same direction as the initial charging direction; a pivotally mounted stationary latch; a latch detent in the latch member facing in the opposite direction from the pawl detent; said latching detent engaging said stationary latch when said driving link and crank have passed the center of rotation of the crank.

2. The structure claimed and set forth in claim 1 comprising in addition: means for releasing said stationary latch to permit said charged spring means to move said member and said actuating link in the discharge direction to rock said lever in a direction opposite to that in which the same was rocked in the charging operation and to drive said driving link and crank back to their initial position.

3. The structure claimed and set forth in claim 2 comprising in addition: means engageable by said lever during rocking thereof in the discharge direction of the spring charging means for closing said switchgear.

4. The structure claimed and set forth in claim 1 comprising in addition: a motor for driving said drive member; said motor continuing to drive said drive member and pawl after disengagement of said pawl; and means for halting said motor after disengagement of said pawl.

5. In a circuit breaker having a movable contact and a complementary contact; a toggle extendible to operate said movable contact to closed position; a rocking lever; one end of said lever being engageable with a portion of said toggle to extend the same to close the contacts on rocking of the lever in a first direction; an actuating link pivotally connected to the other end of said lever; spring driving means; a member connected to said spring driving means for moving the same in a spring charging direction; said member being subject to the biasing action of the spring driving means after the same is charged; said actuating link being connected to said member; means for rocking said lever in a direction opposite to said first direction to drive said actuating link and said member to charge said spring driving means and means for releasably retaining said spring driving means and associated elements in the charged position.

6. In a circuit breaker having a movable contact and a complementary contact; a toggle extendible to operate said movable contact to closed position; a rocking lever; one end of said lever being engageable with a portion of said toggle to extend the same to close the contacts on rocking of the lever in a first direction; an actuating link pivotally connected to the other end of said lever; spring driving means; a member connected to said spring driving means for moving the same in a spring charging direction; said member being subject to the biasing action of the spring driving means after the same is charged; said actuating link being connected to said member; means for rocking said lever in a direction opposite to said first direction to drive said actuating link and said member to charge said spring driving means and means for releasably retaining said spring driving means and associated elements in the charged position and additional means for releasing said charged spring driving means to drive said member and actuating link to rock said lever in said first direction.

7. In a circuit breaker having a movable contact and a complementary contact; a toggle extendible to operate said movable contact to closed position; a rocking lever; one end of said lever being engageable with a portion of said toggle to extend the same to close the contacts on rocking of the lever in a first direction; an actuating link pivotally connected to the other end of said lever; spring driving means; a member connected to said spring driving means for moving the same in a spring charging direction; said member being subject to the biasing action of the spring driving means after the same is charged; said actuating link being connected to said member; means for rocking said lever in a direction opposite to said first direction to drive said actuating link and said member to charge said spring driving means; said last mentioned means comprising a link connected to said lever operable on movement of the link in one direction to rock the lever and associated elements in the spring charging direction; a crank connected to said link to drive the same and means for driving the link in the spring charging direction.

8. In a circuit breaker having a movable contact and a complementary contact; a toggle extendible to operate said movable contact to closed position; a rocking lever; one end of said lever being engageable with a portion of said toggle to extend the same to close the contacts on rocking of the lever in a first direction; an actuating link pivotally connected to the other end of said lever; spring driving means; a member connected to said spring driving means for moving the same in a spring charging direction; said member being subject to the biasing action of the spring driving means after the same is charged; said actuating link being connected to said member; means for rocking said lever in a direction opposite to said first direction to drive said actuating link and said member to charge said spring driving means; said last mentioned means comprising a link connected to said lever operable on movement of the link in one direction to rock the lever and associated elements in the spring charging direction; a crank connected to said link to drive the same and a latch member secured to and concentric with said crank; a driving pawl engageable with said latch member to drive said latch member in a spring charging direction; said pawl being disengageable with said latch member on completion of the spring charging operation.

9. In a circuit breaker having a movable contact and a complementary contact; a toggle extendible to operate said movable contact to closed position; a rocking lever; one end of said lever being engageable with a portion of said toggle to extend the same to close the contacts on rocking of the lever in a first direction; an actuating link pivotally connected to the other end of said lever; spring driving means; a member connected to said spring driving means for moving the same in a spring charging direction; said member being subject to the biasing action of the spring driving means after the same is charged; said actuating link being connected to said member; means for rocking said lever in a direction opposite to said first direction to drive said actuating link and said member to charge said spring driving means; said last mentioned means comprising a link connected to said lever operable on movement of the link in one direction to rock the lever and associated elements in the spring charging direction; a crank connected to said link to drive the same and a latch member secured to and concentric with said crank and a latch engageable with said latch member when the link and crank have completed the movement of said spring driving means and associated elements to charged position, the crank, link and lever being retained in position by the latch against movement to the discharged position where the lever is rocked in said first direction.

10. In a circuit breaker having a movable contact and a complementary contact; a toggle extendible to operate said movable contact to closed position; a rocking lever; one end of said lever being engageable with a portion of said toggle to extend the same to close the contacts on rocking of the lever in a first direction; an actuating link pivotally connected to the other end of said lever; spring driving means; a member connected to said spring driving means for moving the same in a spring charging direction; said member being subject to the biasing action of the spring driving means after the same is charged; said actuating link being connected to said member; means for rocking said lever in a direction opposite to said first direction to drive said actuating link and said member to charge said spring driving means; said last mentioned means comprising a link connected to said lever operable on movement of the link in one direction to rock the lever and associated elements in the spring charging direction; a crank connected to said link to drive the same and a latch member secured to and concentric with said crank; a driving pawl engageable with said latch member to drive said latch member in a spring charging direction; said pawl being disengageable with said latch member on completion of the spring charging operation and a latch engageable with said latch member when the link and crank have completed the movement of said spring driving means and associated elements to charged position, the crank, link and lever being retained in position by the latch against movement to the discharged position where the lever is rocked in said first direction.

References Cited in the file of this patent

UNITED STATES PATENTS

| | | |
|---|---|---|
| 1,272,445 | Holliday | July 16, 1918 |
| 1,771,421 | Ronnberg et al. | July 29, 1930 |
| 1,841,090 | Clarke | Jan. 12, 1932 |
| 2,145,141 | Starr | Jan. 24, 1939 |
| 2,441,412 | Haller | May 11, 1948 |
| 2,492,762 | Palme | Dec. 27, 1949 |
| 2,581,181 | Favre | Jan. 1, 1952 |

FOREIGN PATENTS

| | | |
|---|---|---|
| 709,930 | Great Britain | June 2, 1954 |